United States Patent [19] [11] 4,169,987

Oguro et al. [45] Oct. 2, 1979

[54] MAGNETRON TUBES CATHODE SUPPORT

[75] Inventors: Tomokatsu Oguro; Yoshio Ishida; Mamoru Tsuzurahara; Satoshi Kobayashi, all of Mobara, Japan

[73] Assignee: Hitachi, Ltd., Tokyo, Japan

[21] Appl. No.: 874,836

[22] Filed: Feb. 3, 1978

[30] Foreign Application Priority Data

Feb. 4, 1977 [JP] Japan ................................. 52-11612

[51] Int. Cl.[2] ............................................ H01G 25/50

[52] U.S. Cl. ................................ 315/39.51; 313/270; 313/337; 313/341; 315/39.71

[58] Field of Search .......................... 315/39.51, 39.71; 313/270, 271, 341, 337

[56] References Cited

U.S. PATENT DOCUMENTS

| | | | |
|---|---|---|---|
| 2,719,240 | 9/1955 | Walker | 313/270 X |
| 3,225,246 | 12/1965 | Hollingworth et al. | 313/270 |
| 3,450,927 | 6/1969 | Schmidt et al. | 313/337 |
| 3,854,180 | 12/1974 | Pastijn | 313/271 |
| 3,922,612 | 11/1975 | Tashiro | 315/39.51 |

*Primary Examiner*—Saxfield Chatmon, Jr.
*Attorney, Agent, or Firm*—Charles E. Pfund

[57] ABSTRACT

The magnetron tube is provided with two concentric supports each with one end connected to the opposite ends of the cathode electrode and two concentric cup shaped input terminals respectively connected to the other ends of the supports. Lead wires extending from a filter for preventing leakage of high frequency wave are welded to the edges of the cup shaped input terminals and clamped thereto at portions near the welded ends by clamping members.

5 Claims, 8 Drawing Figures

MAGNETRON TUBES CATHODE SUPPORT

BACKGROUND OF THE INVENTION

This invention relates to a magnetron tube, more particularly an improved connecting structure between the cathode stem and a filter device of a magnetron tube provided with a filter device for preventing leakage of unwanted radiation which causes noises in television receivers.

As disclosed in U.S. Pat. No. 3,987,333, for example, the stem structure of the magnetron tube of the type just described comprises a pair of input terminals connected to the cathode electrode through supports arranged coaxially with the cathode electrode, and spaced from each other by an insulator. The pair of input terminals is connected to the lead terminals of the filter device.

To insulate various elements of the magnetron tube, ceramic insulators are generally used in view of their heat resistant property and excellent high frequency characteristic. For this reason, ceramic insulators are also used for insulating input terminals from each other or insulating them from other members.

On the other hand, each input terminal is made of Kovar (trade name) having substantially the same thermal expansion coefficient as the ceramic insulator so as to prevent various troubles caused by the difference in the thermal expansion coefficients. However, lead wires which are connected to the input terminals are generally made of copper. The melting point of copper is 1083° C. which is lower than the melting point 1450° C. of Kovar so that when the lead wires of the filter device are connected to the input terminals, for example by arc welding, the tips of the lead wires to be welded melt prior to the input terminals, and the molten copper becomes spherical which surrounds the ends of the input terminals prior to the melting of Kovar thus preventing satisfactory welding between the copper lead wires and Kovar input terminals.

It is also difficult to correctly position the lead wires of the filter device with respect to the input terminals, during welding operation. More particularly, as the surface area of the input terminal is considerably larger than the diameter of the lead wires it is difficult to obtain satisfactory welds unless contacting the lead wire to the input terminals over large areas as far as possible and firmly holding the contacted assembly. However, such welding operation is usually performed while urging the lead wires against the input terminals by hands so that it is difficult to maintain this condition until both the lead wires and the input terminals completely melt.

Where the lead wires are secured to the input terminals of the stem structure by using a special jig the mounting position of the lead wires on the stem structure would be fixed. When welding is carried out under these circumstances the result of welding becomes poor. Even when the lead wires are satisfactorily welded to the input terminals, the crystal grains at portions of the lead wires near the welds become large due to the heat of welding thus causing the welds to become brittle and fragile. Accordingly, when the lead wires are merely welded, the portions of the lead wires near the welds would be broken by vibration and shock.

SUMMARY OF THE INVENTION

Accordingly, it is the principal object of this invention to provide a magnetron tube having connecting means that can positively weld together the input terminals of the stem structure and the lead wires of the filter device and wherein the lead wires are not fractured by vibration and shock.

Another object of this invention is to provide a magnetron tube having improved connecting means capable of positioning the filter device at any desired position with respect to the stem structure without fixing the mounting position.

Still another object of this invention is to provide a novel magnetron tube wherein the workability of the connecting operation of the input terminals of the stem structure to the lead wires of the filter device.

According to this invention, there is provided a magnetron tube of the type comprising a cathode electrode, a stem structure for supporting the cathode electrode, an anode cylinder surrounding the cathode electrode, a plurality of vanes mounted on the inner side of the anode cylinder and disposed about the cathode electrode to define an interaction space therebetween, a pair of permanent magnets disposed on the opposite ends of the anode cylinder for creating a uniform magnetic field through the interaction space, and filter means mounted on the input side of the magnetron tube for preventing unwanted leakage radiation of high frequency wave, characterized in that the stem structure comprises two concentric supports having one ends respectively connected to the opposite ends of the cathode electrode and two concentric cup shaped input terminals respectively connected to the other ends of the supports, that the lead wires extending from the filter means are welded to the edges of the openings of the cup shaped input terminals, and that the lead wires are secured to the input terminals at portions near the welded ends by means of clamping members which clamp the lead wires and the edges of the input terminal.

The clamping member is formed by bending a metal strip or metal wire rod into key hole configuration or by helically winding the central portion of a length of metal wire rod and bending the opposite ends of the length into opposing parallel legs. With the latter form, the lead wire is received in the helically wound portion and the parallel legs are used to clamp there between the edge of the input terminal.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
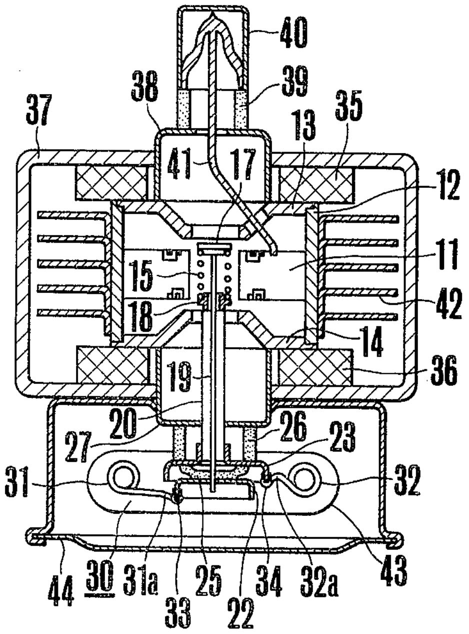
FIG. 1 is a longitudinal sectional view showing one embodiment of the magnetron tube of this invention.

FIG. 1 shows a preferred embodiment of this invention in which permanent magnets are disposed on the outside of a vacuum chamber. A plurality of radial vanes are disposed on the inside of an anode cylinder 12, and pole pieces 13 and 14 of the permanent magnets are disposed on the opposite ends of the anode cylinder 12. In the interaction space defined by the inner ends of the vanes 11 is disposed a cathode electrode 15 in concentric relationship with the anode cylinder. The opposite ends of the cathode electrode 15 are connected to end shields 17 and 18 respectively which are connected to supports 19 and 20 to form a stem structure. In the example illustrated, the support 19 comprises an electroconductive rod whereas the support 20 comprises an electroconductive cylinder and the former is disposed at the axial center of the latter. The outer ends of the supports 19 and 20 are connected to input terminals 22 and 23, respectively. The input terminal 23 is made of metal, for example Kovar and shaped as an inverted cup. The central portion of the input terminal 23 is formed with a upwardly extending boss and the support 20 is inserted into the opening of the boss and soldered thereto. Similarly, the input terminal 22 is made of metal, for example Kovar, and shaped as an inverted cup. An opening is formed at the center of the input terminal 22 and the support 19 is inserted through the opening and soldered to the input terminal 22. Similar to supports 19 and 20, input terminals 22 and 23 are disposed concentrically, and spaced apart and insulated from each other by an insulator 25 made of ceramic, for example.

The input terminal 23 is secured to the bottom of a cup shaped cover 27 through a cylindrical insulator 26 made of ceramic, for example. The upper end of the cover 27 is soldered to the lower surface of the pole piece 14. The input terminals 22 and 23 are connected to the lead wires 31*a* and 32*a* of choke coils 31 and 32 which constitute a filter device 30 by means of clamping members having a cross-sectional configuration resembling a key hole and the lefthand ends of the lead wires 31*a* and 32*a* (as viewed in FIG. 2) are welded to the edges of the openings of the input terminals 22 and 23 respectively.

Figure 2:
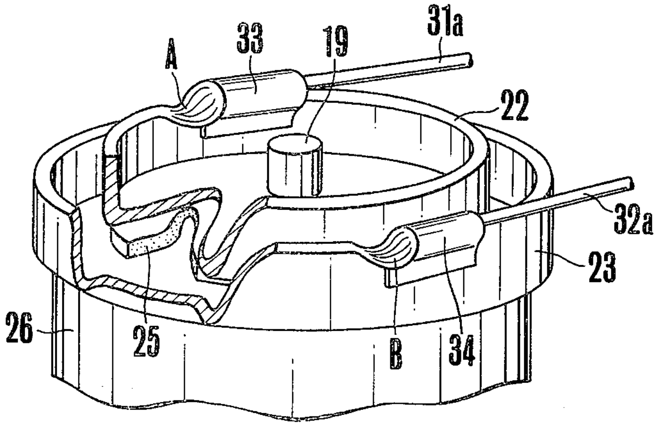
FIG. 2 is an enlarged perspective view, partly in section, showing the detail of the connection between the stem structure and the filter device.
Figure 3:
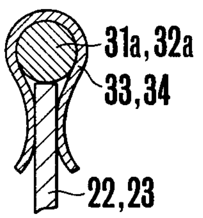
FIG. 3 is a sectional view showing the relationship between a clamping member, a lead wire and an input terminal.

The detail of these elements is best shown in FIGS. 2 and 3. The clamping members 33 and 34 are made of iron or stainless steel. Unless the melting point of these materials is higher than that of the metals utilized to form the input terminals and the lead wires the clamping member would melt first at the time of arc welding, thus loosing the clamping ability. For example, the melting point of iron is 1536.5° C. which is higher than that of copper and Kovar. In the illustrated example, each clamping member is made of a metal strip which is bent to have a key hole configuration so as to provide sufficiently large clamping force. The lower ends of the clamping member are slightly bent outwardly to facilitate insertion of the input terminals 22 and 23. The lead wires 31*a* and 32*a* extend through the circular portions of the key holes and their ends A and B slightly project beyond the clamping members and are arc welded to the edges of the input terminals.

The connecting member described above is formed in the following manner: At first, the lead wires 31*a* and

32*a* of the choke coils 31 and 32 of the filter device 30 are inserted through the circular openings of the clamping members 33 and 34 and then the clamping members are applied to the edges of the input terminals with the ends of the lead wires 31*a* and 32*a* slightly projected beyond the clamping members. Then the ends A and B of the lead wires 31*a* and 32*a* are welded to the edges of the input terminals 22 and 23. With this construction, it is possible to apply the clamping members 33 and 34 to any desired positions along the periphery of the input terminals while containing lead wires 31*a* and 32*a*. Thus, it is possible to fasten the lead wires 31*a* and 32*a* to any desired positions of the opening of the input terminals by merely applying the clamping members to the input terminals so as to clamp them by the opposing legs of the clamping members. Accordingly a considerable length of the lead wires are maintained in contact with the edges of the openings of the input terminals whereby the lead wires are firmly held. When electric current of 20 amperes, for example, is supplied to form electric arcs while supplying inert gas about the ends of the lead wires, the lead wires are satisfactory welded to the input terminals. After welding, since the clamping members 33 and 34 clamp the lead wires 31*a* and 32*a* at portions thereof slightly apart from the welds, it is possible to prevent external pressure from being directly applied to portions which has been rendered brittle by welding as in the prior art. For this reason, breaking of the lead wires at these portions can be efficiently prevented.

As shown in FIG. 1, ring magnets 35 and 36 are disposed on the outside of the interaction space and connected with the pole pieces so as to establish uniform magnetic field in the interaction space. The magnetron tube is enclosed in a yoke 37, and a cup shaped cover 38 is mounted on the pole piece 13, and an output terminal 40 is mounted on the cover 38 through an insulator 39, these members forming a portion of a vacuum chamber. An antenna 41 is connected to the output terminal 40 and heat radiating fins 42 are secured to the outer periphery of the anode cylinder 12. There are also provided a through capacitor unit 43 which constitutes a LC resonance circuit together with the choke coils 31 and 32 for preventing unwanded leakage radiation which cause noises and a shield casing which is provided for the purpose of preventing unwanted radiation of the fundamental wave, sidebandwaves having a frequency of about 2450 MHz, the second, third, and fourth higher harmonics which leak from the portions near the filter device, and the stem structure described above.

Figure 4:
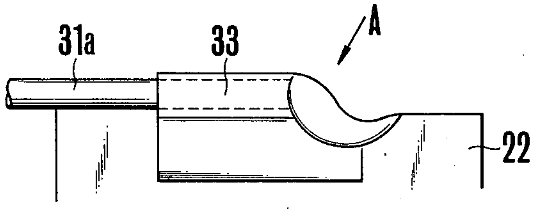
FIG. 4 is a side view showing a modification of the connecting means between the stem structure and the filter device shown in FIG. 1.

FIG. 4 shows a modified construction of the connecting means between input terminal 22 and lead wire 31*a*. While in the foregoing embodiment, the end of the lead wire 31*a* was welded to the input terminal 22, in this embodiment clamping member 33 is also welded to the input terminal 22 together with the end of the lead wire 31*a* as shown by an arrow. With this construction, since the clamping member 33 is also fixed to the input terminal 22, it is possible to more firmly support the lead wire 31*a*.

Figure 5:
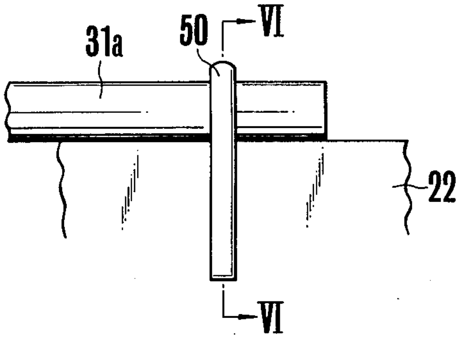
FIG. 5 is a side view showing still further modification of the connecting means.
Figure 6:
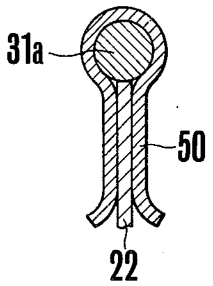
FIG. 6 is a cross-sectional view taken along a line VI—VI in FIG. 5.

FIGS. 5 and 6 show still further modification of this invention. In this embodiment the clamping member 50 is formed by bending a wire rod into key hole configuration. Of course, the diameter of the wire rod is selected such that when the clamping member is applied to the edge of the input terminal it can firmly hold the lead wire 31*a*. Again, the lower ends of the clamping member 50 are slightly curved outwardly to facilitate its application. FIG. 5 shows the assembly before welding. The clamping action of this embodiment is inferior than the previous embodiments but its cost of manufacturing is lower.

Figure 7:
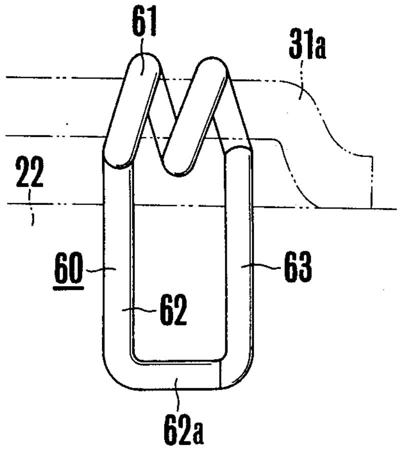
FIG. 7 is a side view showing another example of the clamping member.
Figure 8:
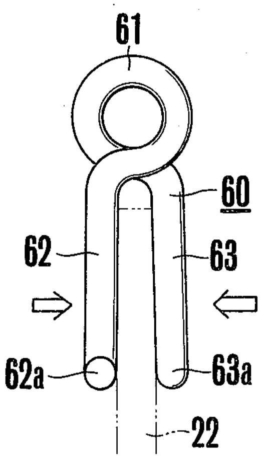
FIG. 8 is a front view of the clamping member shown in FIG. 7 as viewed from right.

FIGS. 7 and 8 illustrate still further modification of this embodiment. In this embodiment a metal wire made of iron or stainless steel is helically wound and the opposite ends 62 and 63 of the helical portion 61 are bent in the form of L and the horizontal legs *62a* and *63a* of the L are disposed to face each other, thereby completing a clamping member 60. Before applying the clamping member onto the input terminal 22 the horizontal legs *62a* and *63a* are spaced apart a distance a little smaller than the thickness of the input terminal 22. To clamp the lead wire *31a* to the input terminal 22 with this clamping member 60, the parallel horizontal legs *62a* and *63a* are pressed toward each other as shown by arrows in FIG. 8 so as to untwist the helical portion 61 thereby enlarging its inner diameter. Then the lead wire *31a* is inserted through the helical portion and when a predetermined length of the lead wire has been inserted the horizontal legs are released consequently, the inner diameter of the helical portion 61 decreases so as to firmly clamp the lead wire against withdrawal. Thereafter, the clamping member 60 is applied onto the edge of the input terminal 22 to clamp it between parallel legs *62a* and *63a*. When the clamping member is mounted on the input terminal, the horizontal legs are separated away a little, but as the lead wire has already been inserted into the helical portion, the clamping force exerted by these legs becomes larger than the case in which the lead wire is not inserted.

With the clamping member shown in FIGS. 7 and 8, as the end of the lead wire *31a* is spaced apart from the edge of the input terminal 22, the protruding end of the lead wire is bent downwardly into contact with the input terminal as shown by dot and dash lines in FIG. 7. Thereafter, these contact portions are welded together. In spite of its simple construction, the clamping member shown in FIGS. 7 and 8 can be readily and firmly mounted on the input terminal and can be manufactured at a low cost.

While the invention has been shown and described in terms of source preferred embodiments thereof, it will be clear that many changes and modifications are obvious to one skilled in the art without departing the spirit of this invention as defined in the appended claim. For example, instead of disposing the permanent magnets on the outside of the vacuum chamber as shown in FIG. 1, they can be contained in the vacuum chamber.

What is claimed is

1. In a magnetron tube of the type comprising a cathode electrode, a stem structure for supporting the cathode electrode, an anode cylinder surrounding said cathode electrode, a plurality of vanes mounted on the inner side of said anode cylinder and disposed about said cathode electrode to define an interaction space therebetween, a pair of permanent magnets disposed on the opposite ends of said anode cylinder for creating a uniform magnetic field through said interaction space, and filter means mounted on the input side of said magnetron tube for preventing unwanted leakage radiation of high frequency wave, the improvement wherein said stem structure comprises two concentric supports each having one end respectively connected to the opposite ends of said cathode electrode, and two concentric cup shaped input terminals respectively connected to the other ends of said supports, lead wires extending from said filter means being welded to the edges of the openings of said cup shaped input terminals, and said lead wires being secured to said input terminals at portions near the welded ends by means of clamping members which clamp said lead wires and said edges of said input terminals.

2. A magnetron tube according to claim 1 wherein each one of said clamping members has a sectional configuration generally resembling a letter U, the extreme ends of the legs of said U being curved outwardly.

3. A magnetron tube according to claim 1 wherein each one of said clamping members comprises a metal strip bent so as to have a key hole like sectional configuration.

4. A magnetron tube according to claim 1 wherein each one of said clamping members comprises a metal rod bent so as to have a key hole like sectional configuration.

5. A magnetron tube according to claim 1 wherein each one of said clamping members comprises a length of metal wire having a helically wound central portion and having opposite ends thereof bent to form parallel opposing legs, said helically wound central portion being adapted to receive one end of said lead wire and said parallel legs being adapted to clamp therebetween the edge of said input terminal.

* * * * *